(12) United States Patent
Rhee et al.

(10) Patent No.: US 6,606,178 B1
(45) Date of Patent: Aug. 12, 2003

(54) METHOD AND SYSTEM TO REDUCE FWM PENALTY IN NRZ WDM SYSTEMS

(75) Inventors: June-Koo Rhee, Corning, NY (US); Jason E. Hurley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/401,871

(22) Filed: Sep. 23, 1999

(51) Int. Cl.[7] ......................... H04B 10/04; H04B 10/00; H04B 10/16; H04J 14/02
(52) U.S. Cl. ..................... 359/183; 359/124; 359/127; 359/161; 359/181; 359/179; 359/188
(58) Field of Search .................. 359/123, 124, 359/127, 161, 183, 188, 181, 180, 179

(56) References Cited

U.S. PATENT DOCUMENTS

| | | | | |
|---|---|---|---|---|
| 5,200,964 A | * | 4/1993 | Huber | 372/26 |
| 5,526,162 A | | 6/1996 | Bergano | 359/181 |
| 5,546,210 A | * | 8/1996 | Chraplyvy et al. | 359/124 |
| 5,566,381 A | | 10/1996 | Korotky | |
| 5,828,478 A | * | 10/1998 | Thomine et al. | 359/181 |
| 5,953,139 A | * | 9/1999 | Nemecek et al. | 359/124 |
| 5,960,146 A | * | 9/1999 | Okuno et al. | 385/122 |
| 5,963,352 A | * | 10/1999 | Atlas et al. | 359/161 |
| 5,970,185 A | * | 10/1999 | Baker et al. | 385/3 |
| 5,978,122 A | * | 11/1999 | Kawazawa et al. | 359/179 |
| 6,005,702 A | * | 12/1999 | Suzuki et al. | 359/183 |
| 6,124,960 A | * | 9/2000 | Garthe et al. | 359/181 |
| 6,134,033 A | * | 10/2000 | Bergano et al. | 359/122 |
| 6,275,636 B1 | * | 8/2001 | Liu et al. | 385/124 |
| 2002/0145777 A1 | * | 10/2002 | Bock et al. | 359/124 |

FOREIGN PATENT DOCUMENTS

| | | | |
|---|---|---|---|
| EP | 0704996 | 9/1995 | |
| EP | 0717524 A2 | 12/1995 | |
| EP | 0695049 | 1/1996 | |
| EP | 0717524 | 6/1996 | |
| GB | 0717524 A2 * | 6/1996 | H04J/14/02 |

OTHER PUBLICATIONS

A. Boskovic et al., "FWM Penalty Reduction in Dense WDM Systems Through Channel Detuning," 2 pages.
Kyo Inoue, "Reduction of Fiber Four–Wave Mixing Influence Using Frequency Modulation in Multichannel IM/DD Transmission," *IEEE Photonics Technology Letters*, vol. 4, No. 11, 11/92, pp. 1301–1304.
N. S. Bergano et al., "Bit–synchronous Polarisation and Phase Modulation Scheme for Improving the Performance of Optical Amplifier Transmission Systems," *Electronic Letters*, vol. 32, No. 1, Jan. 4, 1996, pp. 52–54.
Fabrizio Forghieri et al., "Reduction of Four–Wave Mixing Crosstalk in WDM Systems Using Unequally Spaced Channels," *IEEE Photonics Technology Letters*, vol. 6, No. 6, 06/94, pp. 754–756.
Amnon Yariv et al., "A Reduction of Interferometric Phase–to–Intensity Conversion Noise in Fiber Links by Large Index Phase Modulation of the Optical Beam," *Journal of Lightwave Technology*, vol. 10, No. 7, 07/92, pp. 978–981.

* cited by examiner

*Primary Examiner*—Leslie Pascal
*Assistant Examiner*—M. R. Sedighian
(74) *Attorney, Agent, or Firm*—Price, Heneveld, Cooper, DeWitt & Litton; Juliana Agon

(57) ABSTRACT

A method and a system are disclosed for reducing four-wave mixing (FWM) penalties in an optical transmission network. The FWM penalties are reduced by simultaneously and periodically modulating the phase of the optical signals propagating through a long fiber waveguide at a modulation frequency that causes destructive interference of the FWM products that are otherwise generated along the length of the long fiber waveguide. The method may be implemented in an optical transmitter for an optical transmission network by providing a phase modulator between the multiplexer and an optical boost amplifier so as to simultaneously modulate the phase of all the optical signals that are transmitted through the long fiber waveguide. Alternatively, a phase modulator may be disposed between each source of modulated optical signals and the multiplexer so as to separately modulate the phase of all the optical signals that are subsequently transmitted through the long fiber waveguide.

17 Claims, 7 Drawing Sheets

— with PM
----- w/o PM

■ 2.5 Gbps NRZ w/o PM
● 2.5 Gbps NRZ, PM sync.
▲ 2.5 Gbps NRZ, PM 3 GHz

METHOD AND SYSTEM TO REDUCE FWM PENALTY IN NRZ WDM SYSTEMS

BACKGROUND OF THE INVENTION

1. Field of the Invention

The present invention generally relates to optical transmission systems and networks, and more particularly to methods and systems for reducing four-wave mixing (FWM) in optical transmission networks.

2. Technical Background

FWM is a non-linear effect exhibited by optical waveguide fibers when multiple wavelengths (frequencies) are simultaneously transmitted through the fiber as, for example, in wavelength division multiplexed (WDM) systems. In particular, when at least two signals at different frequencies are transmitted through a fiber, the two signals will interfere and generate FWM cross-talk product of different wavelengths. See, for example, the dashed lines in FIG. 1, which represent transmitted signals and the resultant FWM products. The more optical signals that are transmitted through the fiber, the more FWM cross-talk products are generated, since there are more signals to interfere with one another. When transmitting through the fiber over long distances, the fiber is typically divided into spans, with in-line optical amplifiers positioned between the spans. A typical span is, for example, 80 km in length. Each time the transmitted signals are amplified by one of the in-line optical amplifiers, the FWM products are amplified, and additional FWM products are generated due to the interference of the FWM products with each of the modulated optical signals and the interference of the FWM products with each other.

The strength of the FWM products depends on the power levels at the original starting frequencies, the fiber dispersion, and the channel spacing. The use of optical amplifiers to achieve longer unrepeated lengths in optical fiber transmission systems has resulted in higher power levels and thus stronger FWM products. In addition, when dispersion-shifted fibers are used, FWM is enhanced as a result of the reduction of the phase mismatch naturally provided by fiber dispersion.

The International Telecommunication Union's (ITU) standards for dense wavelength division multiplexed systems further exacerbate the problem. Specifically, the ITU has specified that WDM systems should have equal frequency spacing between channels within a certain tolerance, e.g., a 200 GHz channel spacing with a tolerance of ±40 GHz about the center frequency of each channel (the ITU grid). Exact equal spacing results in many of the FWM products coinciding (overlapping) with the channel frequencies. Crosstalk is thus maximized when the ITU standards are achieved, i.e., when the center frequency for each signal is at the ITU standard.

As a result of these considerations, FWM is today one of the limiting non-linear processes in optical fiber transmission systems. A number of proposals which employ unequal spacing between signal channels to address this problem have appeared in the literature. See J-S. Lee and D-H. Lee, *OFC Proceedings*, FC5, 393 (1998); Y. Hamazumi, M. Koga, and K. Sato, *IEEE Photonics Technol. Lett.*, 8, 718 (1996); F. Forghieri, R. W. Tkach, A. R. Chraplyvy, and D. Marcuse, *IEEE Photonics Technol. Lett.*, 6, 754 (1994); and F. Forghieri, R. W. Tkach, and A. R. Chraplyvy, *J. Lightwave Technol.*, 13, 889 (1995).

These schemes for locating signal channels suffer from a number of deficiencies. First, they rely on extensive mathematical calculations to determine the optimum position of the channels, i.e., the position where minimum overlap with the FWM products is achieved. Although these algorithms can determine the optimum position where the FWM penalties are at their minimum, the resulting channel positions are complicated to implement in practice, since they involve a set of channel frequencies, which have complex relationships to one another.

Second, the schemes leave numerous unused slots between channels, which results in a significant expansion of the transmission bandwidth, a clearly undesirable result, since the overall goal of WDM is to place as many channels as possible into a given bandwidth.

Finally, the schemes generally do not result in channel locations which meet the requirements of the ITU grid. Thus, although they can reduce FWM, such reduction may be at the expense of standardization of WDM technology on a worldwide basis.

Other approaches to reduce FWM products include dithering of the source laser frequencies. See K. Inoue, "Reduction of Fiber Four-wave Mixing Influence Using Frequency Modulation in Multi-channel IM/DD Transmission," *IEEE Photon. Technol. Lett.*, Vol. 4, No. 11, pp. 1301–1304 (1992). Frequency dithering requires frequency modulation of all individual WDM laser sources, which may result in substantial and residual amplitude modulation that degrades system performance. Thus, frequency dithering has not been used in practice.

SUMMARY OF THE INVENTION

An aspect of the invention is to provide a system for reducing FWM without the above-described detrimental effects. Specifically, it is an aspect of the present invention to provide a system for reducing FWM without adjusting the channel frequencies. To achieve these and other aspects and advantages, a method is provided that comprises modulating the phase of the optical signals propagating through a long fiber waveguide at a modulation frequency that causes destructive interference of FWM products that are otherwise generated along the length of the long fiber waveguide. This method may be implemented in a transmitter for an optical transmission network by providing a phase modulator between the multiplexer and an optical boost amplifier to simultaneously modulate the phase of all the optical signals that are transmitted through the long fiber waveguide.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
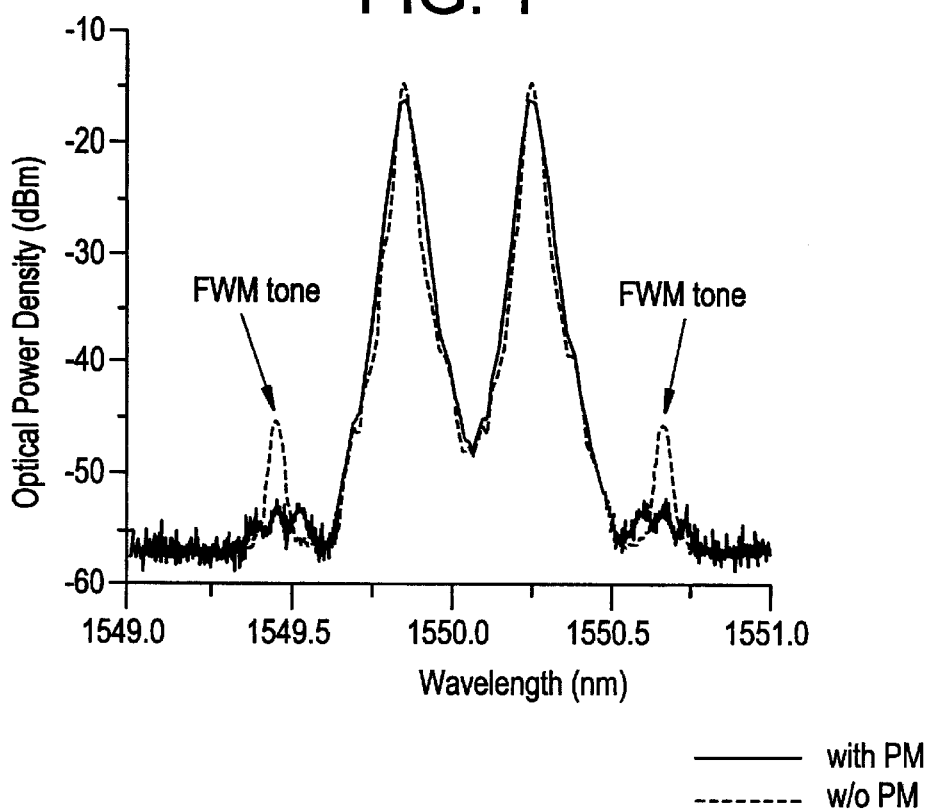
FIG. 1 is a graph showing the optical power density over a wavelength band including two wavelength channels with and without phase modulation.

Reference will now be made in detail to the present preferred embodiments of the invention, examples of which are illustrated in the accompanying drawings. Wherever possible, the same reference numerals will be used throughout the drawings to refer to the same or like parts.

Figure 2:
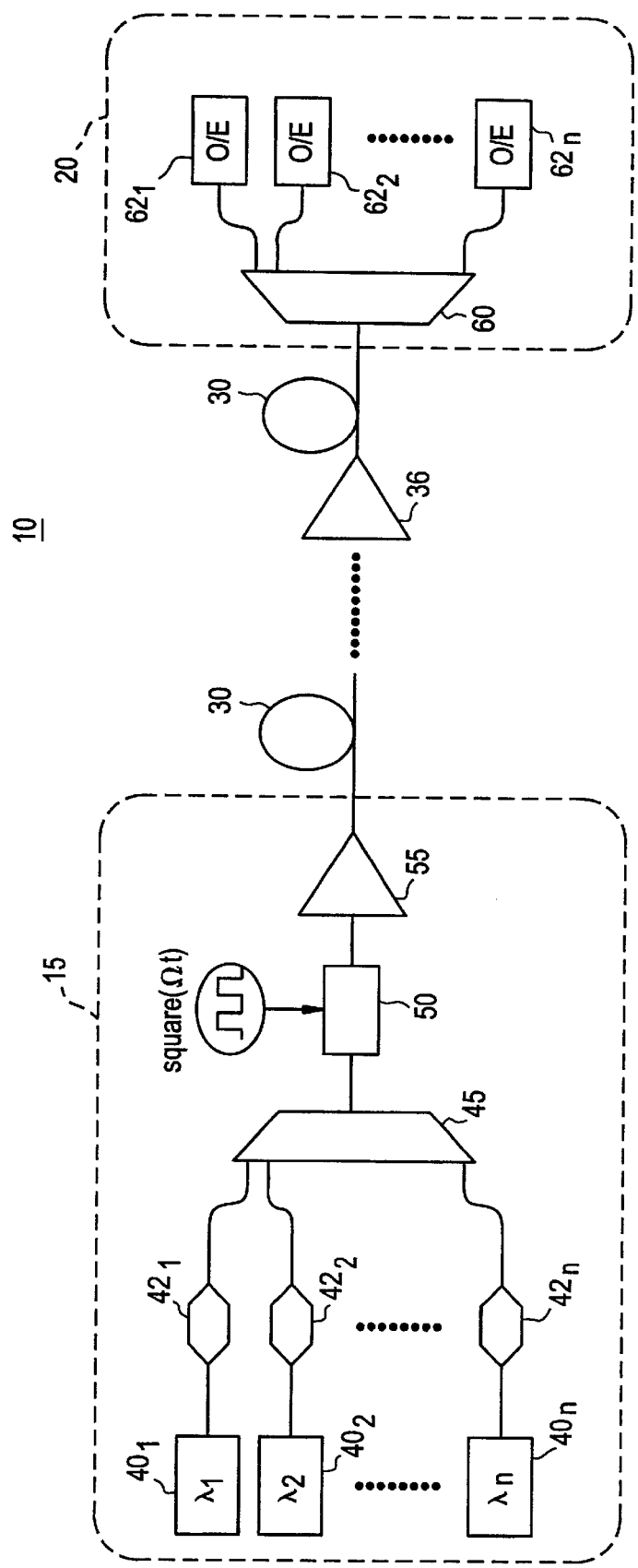
FIG. 2 is an optical circuit diagram in block form of an optical transmission network constructed in accordance with a first embodiment of the present invention.

FIG. 2 shows an optical transmission network constructed in accordance with the present invention. In general, optical transmission network 10 includes a transmitter 15 and a receiver 20 coupled together by a long fiber waveguide 30. Depending upon the length required for fiber 30, the fiber may include several spans with in-line optical amplifiers 36 provided at periodic intervals in fiber 30. A typical optical transmission network will include an in-line optical amplifier 36 for each 80 km span of optical fiber. As explained below, the longer the optical fiber, the greater the number of in-line optical amplifiers that are required, which increases the FWM penalty that is caused through constructive interference of the transmitted optical signals and any FWM products that are generated along the transmission path of fiber 30.

Transmitter 15 includes a plurality of laser diodes $40_1$, $40_2$ ... $40_n$, each serving as a source of light having a different wavelength $\lambda_1$, $\lambda_2$ ... $\lambda_n$, respectively. Transmitter 15 further includes a data modulator $42_1$, $42_2$ ... $42_n$, for each laser diode $40_1$, $40_2$ ... $40_n$, respectively. The data modulators modulate the amplitude of the light provided from each of the laser diodes to create a plurality of optical signals that are to be transmitted through long fiber 30 to receiver 20. Each of the optical signals in the n channels is supplied to an optical multiplexer 45 in which the optical signals are wavelength division multiplexed and transmitted into fiber 30. All of the optical signals transmitted through fiber 30 have their phase simultaneously modulated by a phase modulator 50, which is described in detail below. The optical signals are then amplified by a boost amplifier 55 prior to being transmitted through the first span of the long fiber waveguide 30.

Receiver 20 may be a conventional receiver as used in this type of network and typically includes an optical demultiplexer 60, which separates each of the optical signals transmitted in the various channels through long fiber 30 by a wavelength, such that the separated optical signals may be supplied to a respective optical-to-electrical converter $62_1$, $62_2$ ... $62_n$.

In the above-described system, laser diodes 40, data modulators 42, optical multiplexer 45, boost amplifier 55, long fiber 30, in-line amplifiers 36, optical demultiplexer 60, and optical-to-electrical converters 62 are well known in the art and are not described further. Phase modulator 50 may be any conventional phase modulator, but is preferably the APE™ phase modulator, part No. PM-150-080 commercially available from JDS Uniphase of San Jose, Calif.

Figure 4B:
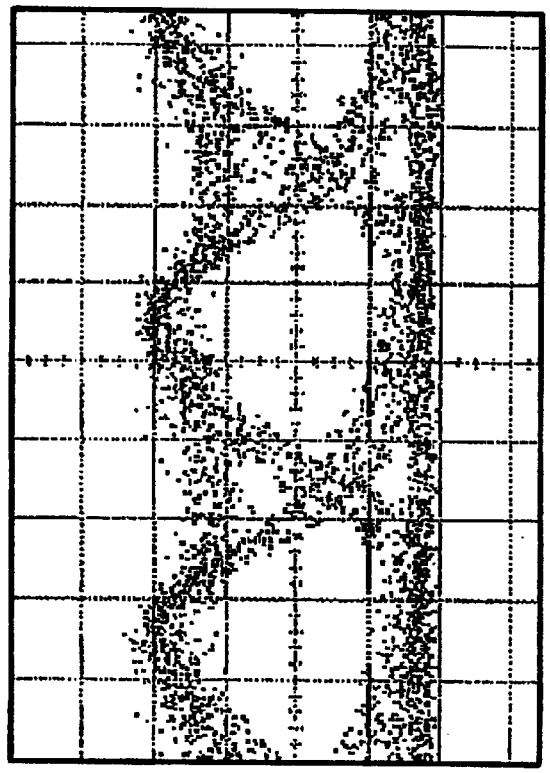
FIG. 4B is an eye diagram obtained using the optical transmission network constructed in accordance with the present invention.
Figure 4A:
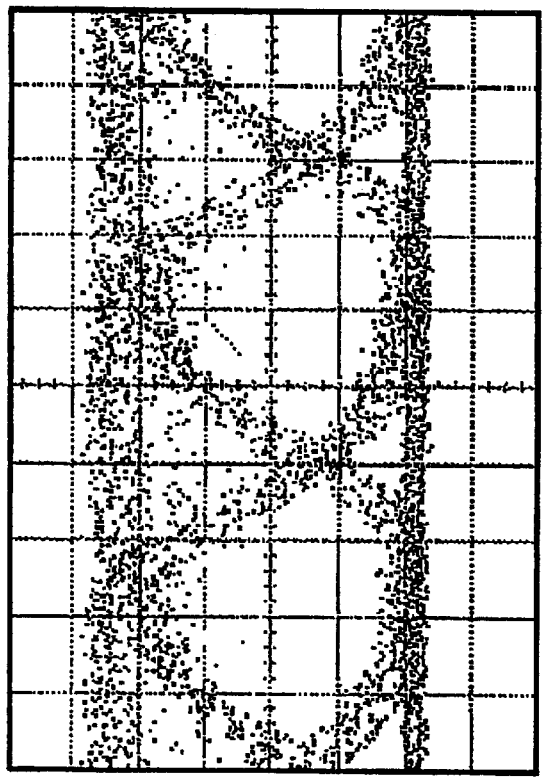
FIG. 4A is an eye diagram obtained using a conventional transmission network without phase modulation.

As explained in detail below, the careful choice of phase modulation frequency and modulation depth based on fiber dispersion eliminates FWM tone generation in a non-return-to-zero (NRZ) modulation format, multi-span link. Periodic phase modulation introduces interesting features in an intensity-modulation and direct-detection system that do not require a change in the direct-detection receiver. For example, phase modulation synchronized to intensity data modulation enhances eye opening due to the chirp introduced by the phase modulation. FIGS. 4A and 4B illustrate the effects on eye opening due to phase modulation. FIG. 4A shows an eye diagram where phase modulation was not used while FIG. 4B shows an eye diagram where phase modulation was utilized. As evident from these diagrams, in this example of a FWM-limited WDM system, the noise distribution on the "upper rails" of the eyes is considerably reduced (thinner rail) with phase modulation.

In a multi-span wavelength division multiplexed transmission, FWM products are generated independently within the non-linear length of each span. FWM products at the same wavelength then interfere with one another, either constructively or destructively, depending on the phase relation given by the fiber dispersion equation:

$$E_f(t) = \sum_{k \in spans} E_f^k(t) = \sum_{k \in spans} E_f^1(t) e^{i(k-1)[\phi' + \phi'']} \quad (1)$$

where $E_f$ and $E_f^k$ represent the total FWM field and the individual FWM field from the k-th span, respectively. It has been assumed that the efficiency and amplitude of the FWM generation are the same for all spans. The exponent on the right side of Equation (1) represents the phase of FWM from individual spans with respect to the first span. The phase function $\phi'$, which is independent of phase modulation, is given as a function of the dispersion coefficient D, span length L and channel spacing $\Delta\lambda$:

$$\phi'(\Delta\lambda, DL) = -2\tau\Delta\omega(pq - rf) \quad (2)$$

where $\tau$ is the group delay difference between neighboring channels and is defined as:

$$\tau = DL\Delta\lambda \quad (3)$$

and $\Delta\omega$ is the channel spacing in angular frequency:

$$\Delta\omega = 2\pi c\Delta\lambda/\lambda^2, \quad (4)$$

so that optical frequency of channel p is defined as $\omega_p = \omega_o + \Delta\omega \cdot p$ ($\omega_0$ is the frequency of the longest wavelength channel). Channel indices p, q, and r correspond to the FWM pumps, and index f corresponds to the channel where the FWM product is generated ($\omega_f = \omega_p + \omega_q - \omega_r$). Note that when $\phi'$ becomes multiples of $2\pi$, the FWM fields from all spans resonantly add up to produce a large FWM penalty.

When periodic phase modulation is applied to all channels simultaneously, with a square-wave function sq ($\Omega\tau$), whose value alternates between ±1, the phase modulation-dependent phase $\phi'$ is given by:

$$\phi''(\Omega,\Delta\lambda,DL) = m[sq(\Omega\tau + (p-f)\Omega\tau) + sq(\Omega\tau + (q-f)\Omega\tau) - sq(\Omega\tau + (r-f)\Omega\tau)] \quad (5)$$

Here, the period and depth of the modulation are $2\pi/\Omega$ and m, respectively. For wavelengths where FWM fields are resonantly additive, this modulation dependent phase term alters the resonant phase condition, and thus suppresses the power of the FWM product. As one of the best examples, if one chooses $m=\pi/4$ and $\Omega\tau=\pi$ n such that $\phi''=\pm\pi$, the FWM products from successive spans interfere completely destructively for the p=q=r±1 (degenerate) case.

The above model was verified with a two-channel, two-span WDM non-zero dispersion-shifted fiber (NZDSF) transmission link. Two continuous-wave laser outputs at 1549.85 and 1550.25 nm (50-GHz spacing) are first phase-modulated with a square waveform and then boosted to +7 dBm by an erbium-doped fiber amplifier (EDFA) 55 (FIG. 2). The output from the EDFA 55 is transmitted through two spans of 80 km LEAF® fiber 30 available from Corning Inc., with another EDFA 36 between the two spans. The input power of the second span is kept the same as that of the first one. The FWM power was then measured on an optical spectrum analyzer (OSA) with and without phase modulation. FIG. 1 presents optical spectrum data that shows an approximately 10-dB suppression of FWM generation at a 4 GHz modulation frequency and $\sim 0.17\pi$ modulation depth. The FWM powers are compared after background subtraction. Considering the dispersion D=3.86 ps/nm·km estimated from the dispersions measured at 1530 and 1565 nm, it was found that $\Omega\tau = 0.9887\pi$, thereby showing excellent agreement with the model.

Application of phase modulation to NRZ transmission requires a careful consideration of the chromatic dispersion effect, since the pulse modulation introduces waveform distortion when the net dispersion is not zero. The dispersion effect becomes equivalent to a noise when the pulse modulation is not synchronized to NRZ modulation. For a synchronous case, the phase modulation frequency cannot be selected other than the harmonics of the data clock frequency. Nonetheless, this synchronous phase modulation is effective in reduction of the FWM penalty because (1) FWM power (cross-talk level) is still reduced and (2) the spectrum of the FWM product beat noise is broadened to be outside of an adequate receiver bandwidth while the signal bandwidth is kept the same. In addition, synchronous phase modulation increases the eye opening due to the effect of chromatic dispersion distortion.

Figure 3:
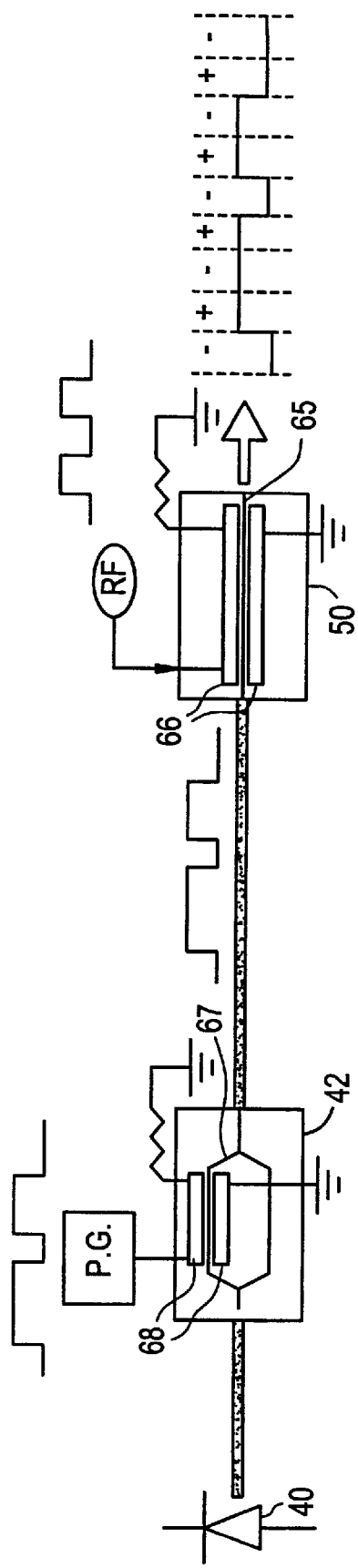
FIG. 3 is an optical circuit diagram in schematic form which also illustrates the data modulation and phase modulation imparted onto a light signal from a laser diode in accordance with the method of the present invention.

To demonstrate the suppression of the FWM penalty using phase modulation, a transmission network such as that shown in FIG. 2 was constructed consisting of 10 WDM channels. As shown in FIG. 3, phase modulator 50 was constructed using a LiNbO$_3$ phase modulator having an electro-optic optical waveguide 65 juxtaposed between two electrodes 66, while data modulators 42 were constructed using Mach-Zehnder NRZ intensity modulator having an electro-optic optical waveguide 67 juxtaposed between two electrodes 68. Phase modulator 50 introduces phase modulations on all channels simultaneously. A pseudo-random binary sequence (PRBS) generator with a $2^7-1$ word length is used for data modulation at 2.5 Gb/s, and a square-wave derived from the PRBS clock is applied to phase modulator 50.

The same phase modulation depth of $0.35\pi$ was applied. The time delay (modulation phase) of the phase modulation is carefully chosen to enhance the eye opening after propagation through five spans of 80-km LEAF® fiber. The channel spacing is 50 GHz (1549.3–1552.9 nm), and the power per channel is set at +7 dBm to generate a strong FWM penalty.

Figure 6:
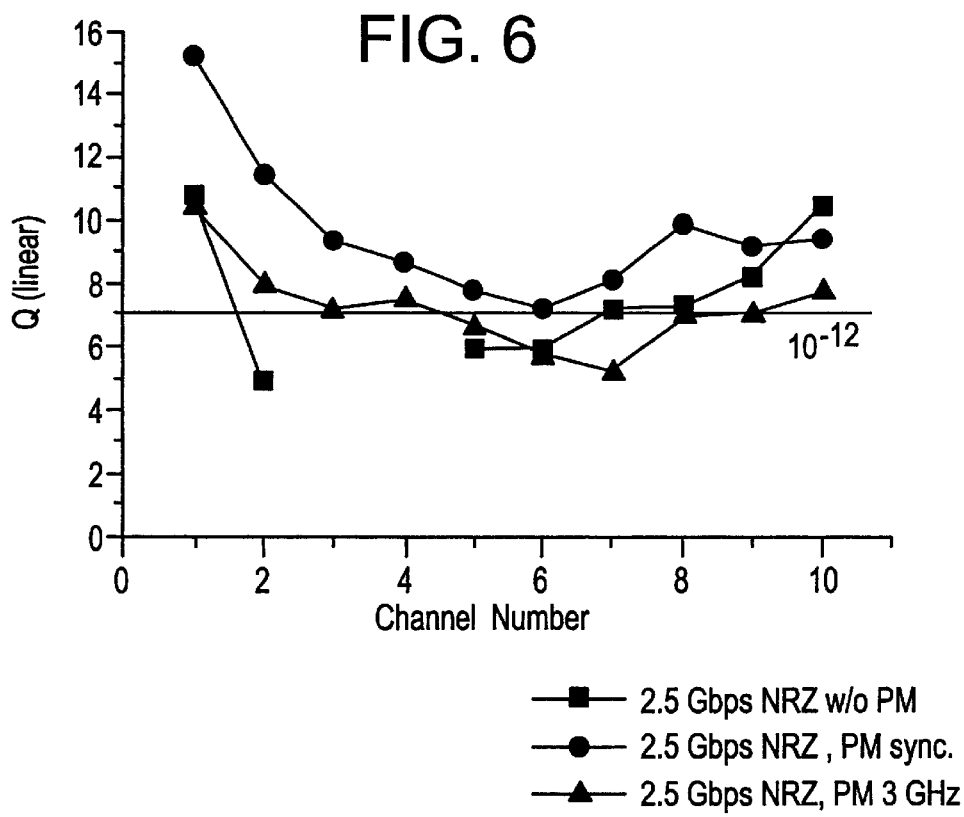
FIG. 6 is a graph of Q comparisons of ten different channels for three different optical transmission networks.
Figure 5A:
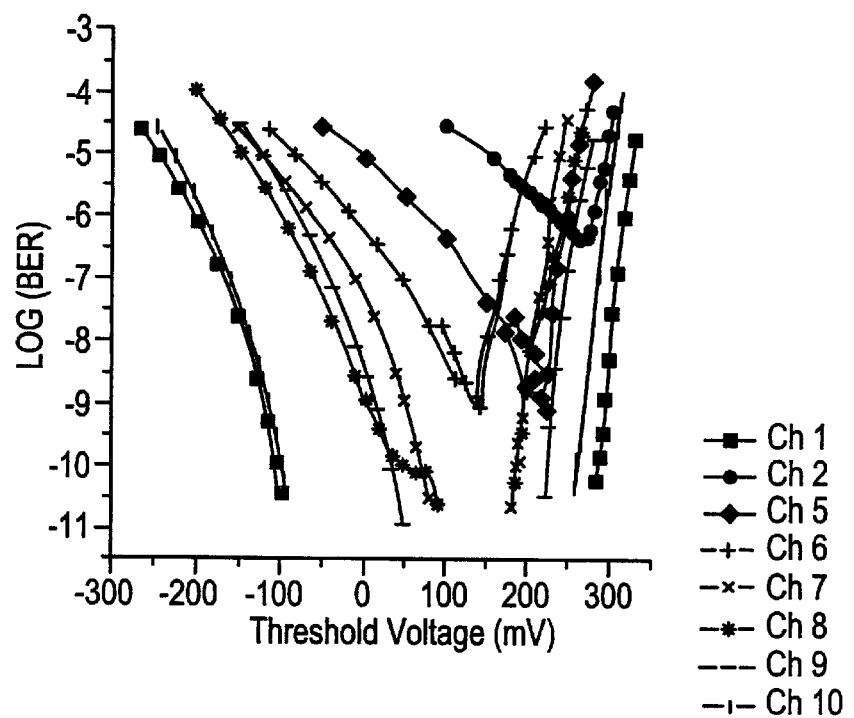
FIG. 5A is a graph showing the log of the bit error rate as a function of threshold voltage for ten channels transmitted through a conventional optical transmission network.
Figure 5B:
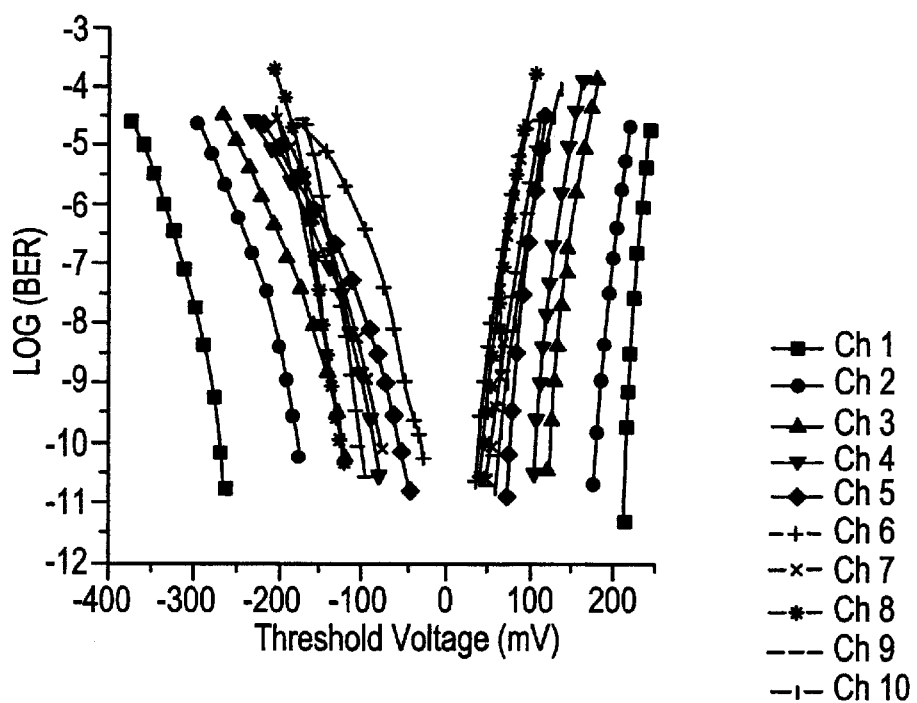
FIG. 5B is a graph showing the log of the bit error rate as a function of threshold voltage for ten channels transmitted through an optical transmission network constructed in accordance with the present invention.

In FIGS. 5A and 5B, the system performance is plotted in what is known as a BERV curve in which the log of the bit error rate (BER) is plotted as a function of threshold voltage in millivolts. Ideally, sufficient separation should exist between the two lines for each channel to enable a threshold voltage to be readily established for distinguishing between a binary high level and a binary low level. The plot in FIG. 5A was obtained without using any phase modulation, while the plot shown in FIG. 5B was obtained using synchronous 2.5 GHz phase modulation. The system performance was also plotted as Q parameters as shown in FIG. 6. The Q parameters show considerable enhancement of the performance when phase modulation is used, especially on channels 3 and 4. In the experiment, the BER analyzer failed in synchronizing to the PRBS pattern on channels 3 and 4 because of strong FWM penalties when no phase modulation is applied. The strong local impairments can be attributed to the multi-span resonance effect of FWM generation. As phase modulation is applied, FWM cross-talk levels at channels 3 and 4, respectively, decrease from −17.1 and −17.7 dB to −18.6 and −18.7 dB.

As apparent from the foregoing, above equations can be used to determine the phase modulation frequency and the depth of modulation for fibers having different dispersion characteristics and different lengths. The modulation frequency and depth of modulation are controlled by a square wave electrical signal applied to the phase modulator that has a frequency and amplitude corresponding to the desired phase modulation frequency and depth of modulation, respectively.

Figure 7A:
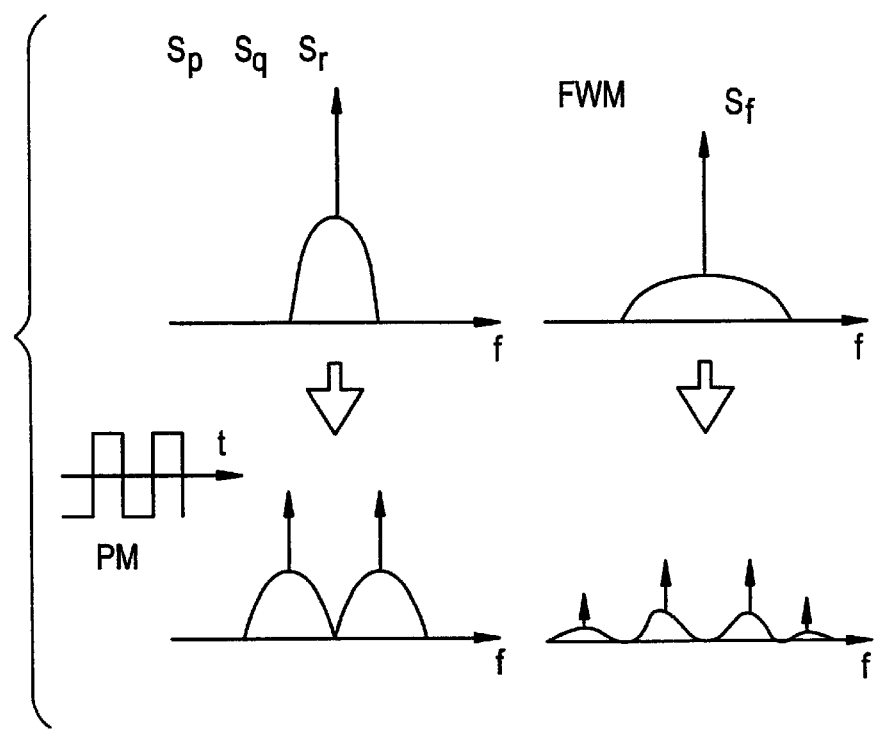
FIG. 7A is a series of graphs illustrating the spectral effect of phase modulation.
Figure 7B:
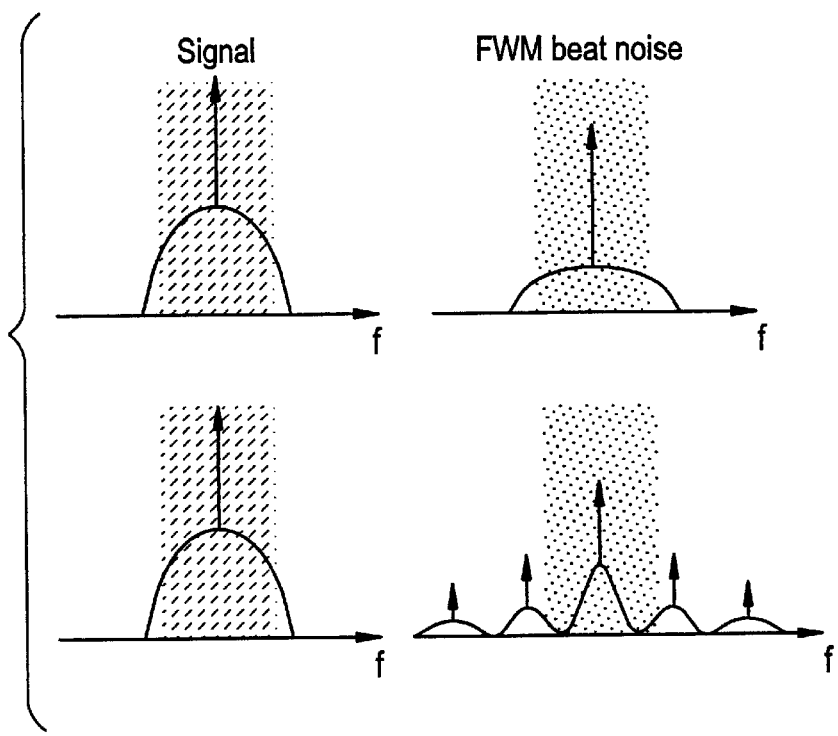
FIG. 7B is a series of graphs illustrating the effect of phase modulation on direct detection by a receiver.

Even with an abnormally high FWM cross-talk level, reliable data transmission can be achieved with estimated BERs less than $10^{-12}$. This is attributed to the spectral broadening of the FWM-signal beat noise, which allows less noise power through the receiver electrical bandwidth. FIGS. 7A and 7B illustrate the spectral broadening effect of utilizing phase modulation. Specifically, FIG. 7A illustrates the spectral effective phase modulation on FWM products $S_f$, where:

$$S_f = |E_f(\omega)|_2 = \eta_{pqr}|E_p^*(\omega) \oplus (E_q(\omega) \oplus E_r(\omega))|^2 \quad (6)$$

Here, $\eta_{pqr}$ is a coefficient for FWM generation efficiency that takes into account the effects from fiber non-linearity, attenuation, chromatic dispersion, and the channel spacing.

FIG. 7B illustrates the effect phase modulation has on direct detection by a receiver, where the intensity of the FWM beat noise $I_{f-beat}$, which equals:

$$I_{f-beat} = Es(\omega) \oplus E_f(\omega) \quad (7)$$

The effect of asynchronous phase modulation was investigated by maintaining all the experimental conditions consistent except that a free-running 3 GHz square wave was applied to the phase modulator. In this case, the Q performance was enhanced for channels 1–4, with estimated BERs lower than $10^{-12}$ but deteriorates the performance of channels 6–10 with ~1 dB Q penalties, in average.

Figure 8:
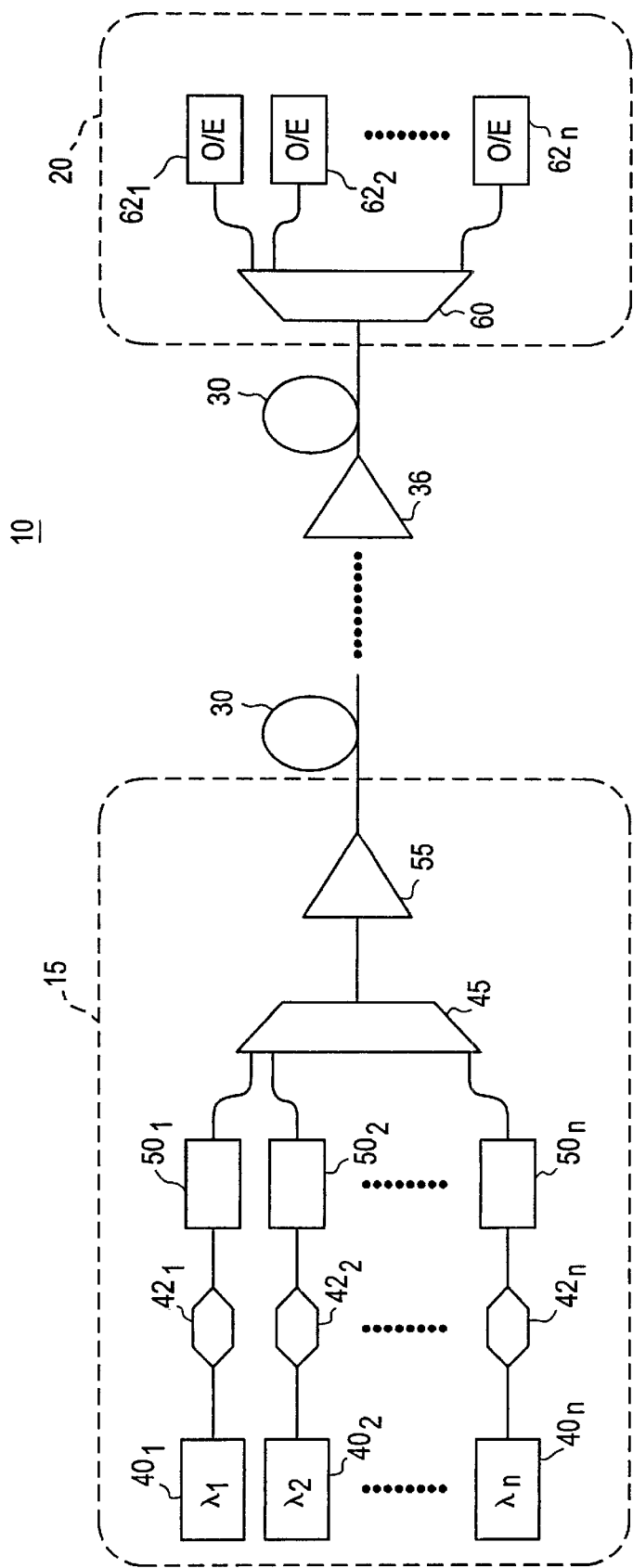
FIG. 8 is an optical circuit diagram in block form of an optical transmission network constructed in accordance with a second embodiment of the present invention.

FIG. 8 shows an optical transmission network constructed in accordance with a second embodiment of the present invention. The second embodiment of the optical transmission network, is identical to the first embodiment with the exception that phase modulator 50 is replaced by a plurality of phase modulators $50_1$–$50_n$, which are provided between a respective data modulator $42_1$–$42_n$, and multiplexer 45. Alternatively, phase modulators $50_1$–$50_n$, could be positioned between laser sources $40_1$–$40_n$, and data modulators $42_1$–$42_n$.

It will be apparent to those skilled in the art that various modifications and adaptations can be made to the present invention without departing from the spirit and scope of this invention. Thus, it is intended that the present invention cover the modifications and adaptations of this invention, provided they come within the scope of the appended claims and their equivalents.

The invention claimed is:

1. An optical transmitter for use in an optical transmission network having a long fiber waveguide through which a plurality of wavelength division multiplexed signals are transmitted, said transmitter comprising:
   a plurality of sources of modulated optical signals each having a different wavelength;
   a multiplexer coupled to each of said sources for receiving the modulated optical signals and transmitting the optical signals over said long fiber waveguide;
   a phase modulator for modulating the phase of the optical signals propagating through the long fiber waveguide; and
   an optical amplifier for amplifying the phase-modulated optical signals as the optical signals propagate through the long fiber waveguide,
   wherein said phase modulator modulates the optical signals at a frequency that causes destructive interference of four wave mixing cross-talk products generated along the length of the long fiber waveguide.

2. The optical transmitter as claimed in claim 1, wherein said plurality of sources modulate the optical signals at a predetermined pulse modulation frequency, and said phase modulator modulates the phase of the optical signals at a frequency that is substantially equal to the predetermined pulse modulation frequency.

3. The optical transmitter as claimed in claim 1, wherein said phase modulator periodically modulates the phase of the light carrying the optical signals in response to a periodic electrical signal with a square pulse waveform.

4. The optical transmitter as claimed in claim 1, wherein said phase modulator simultaneously modulates the phase of all of the optical signals propagating through the long fiber waveguide.

5. The optical transmitter as claimed in claim 1, wherein said plurality of sources include a plurality of lasers and a corresponding plurality of intensity modulators for modulating the light generated by a corresponding laser.

6. An optical transmission network comprising:
   a long fiber waveguide;
   a plurality of sources of modulated optical signals each having a different wavelength;
   a multiplexer coupled to each of said sources for receiving the modulated optical signals and transmitting the optical signals over said long fiber waveguide; and
   a phase modulator for modulating the phase of the optical signals propagating through the long fiber waveguide,
   wherein said phase modulator modulates the optical signals at a frequency that causes destructive interference of four wave mixing cross-talk products generated along the length of the long fiber waveguide.

7. The optical transmission network as claimed in claim 6, wherein said plurality of sources modulates the optical signals at a predetermined pulse modulation frequency, and said phase modulator modulates the phase of the optical signals at a frequency that is substantially equal to the predetermined pulse modulation frequency.

8. The optical transmission network as claimed in claim 6, wherein said phase modulator periodically modulates the phase of the light carrying the optical signals in response to a square wave electrical signal.

9. The optical transmission network as claimed in claim 6, wherein said phase modulator simultaneously modulates the phase of all of the optical signals propagating through said long fiber waveguide.

10. The optical transmission network as claimed in claim 6 and further comprising at least one optical amplifier for amplifying the phase-modulated optical signals as the optical signals propagate through the long fiber waveguide.

11. The optical transmission network as claimed in claim 6 and further comprising a receiver coupled to the long waveguide for receiving the optical signals propagating therethrough.

12. A method for reducing FWM cross-talk in an optical transmission network having a long common fiber through which a plurality of modulated optical signals propagates, the method comprising the step of modulating the phase of the optical signals propagating through the long fiber at a modulation frequency that causes destructive interference of FWM products that are otherwise generated along the length of the long fiber.

13. The method as claimed in claim 12, wherein the phase of the optical signals is modulated at a frequency that is substantially equal to a frequency at which the intensity of the optical signals is modulated.

14. The method as claimed in claim 12, wherein the light carrying the optical signals is modulated in response to a square wave electrical signal.

15. The method as claimed in claim 12, wherein the phase of all of the optical signals propagating through the long fiber waveguide is simultaneously modulated.

16. An optical transmitter for use in an optical transmission network having a long fiber waveguide through which a plurality of wavelength division multiplexed signals are transmitted, said transmitter comprising:
   a plurality of sources of optical signals each having a different wavelength;
   a plurality of phase modulators for separately modulating the phase of the optical signals supplied from the plurality of sources;
   a multiplexer coupled to each of said phase modulators for receiving the phase-modulated optical signals and transmitting the optical signals over said long fiber waveguide; and
   an optical amplifier for amplifying the phase-modulated optical signals as the optical signals propagate through the long fiber waveguide,
   wherein said phase modulators modulate the optical signals at a frequency that causes destructive interference of four wave mixing cross-talk products generated along the length of the long fiber waveguide.

17. The optical transmitter as claimed in claim 16, wherein said plurality of sources include a plurality of lasers and a corresponding plurality of intensity modulators for modulating the light generated by a corresponding laser and said plurality of phase modulators are disposed between a corresponding intensity modulator and said multiplexer.

* * * * *

UNITED STATES PATENT AND TRADEMARK OFFICE
CERTIFICATE OF CORRECTION

PATENT NO. : 6,606,178 B1
DATED : August 12, 2003
INVENTOR(S) : June-Koo Rhee et al.

It is certified that error appears in the above-identified patent and that said Letters Patent is hereby corrected as shown below:

Column 5,
Line 9, "$\phi$"" should be -- $\phi´´$ --
Line 18, "n such" should be -- such --.
Line 39, "$\Omega\tau=0.9887\pi$" should be -- $\Omega\tau=0.988\pi$ --.

Column 6,

Line 51, "$S_f = |E_f(\omega)|_2 = \eta_{pqr} |E_p^*(\omega)\otimes(E_q(\omega)\otimes E_r(\omega))|^2$" should be
-- $S_f = |E_f(\omega)|^2 = \eta_{pqr} |E_p^*(\omega)\otimes(E_q(\omega)\otimes E_r(\omega))|^2$ --.

Signed and Sealed this

Thirtieth Day of March, 2004

JON W. DUDAS
*Acting Director of the United States Patent and Trademark Office*